US011516357B2

(12) United States Patent
Ikeda

(10) Patent No.: US 11,516,357 B2
(45) Date of Patent: Nov. 29, 2022

(54) VOICE INTERACTION IN AN IMAGE PROCESSING SYSTEM

(71) Applicant: SEIKO EPSON CORPORATION, Tokyo (JP)

(72) Inventor: Iwane Ikeda, Nagano (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/109,299

(22) Filed: Dec. 2, 2020

(65) Prior Publication Data

US 2021/0168247 A1 Jun. 3, 2021

(30) Foreign Application Priority Data

Dec. 3, 2019 (JP) .............................. JP2019-218612

(51) Int. Cl.
*H04N 1/00* (2006.01)
*G06F 3/16* (2006.01)
*G10L 15/22* (2006.01)

(52) U.S. Cl.
CPC ......... *H04N 1/00403* (2013.01); *G06F 3/167* (2013.01); *G10L 15/22* (2013.01); *H04N 1/0049* (2013.01)

(58) Field of Classification Search
None
See application file for complete search history.

(56) References Cited

U.S. PATENT DOCUMENTS

| 6,253,184 B1 * | 6/2001 | Ruppert ............. G03G 15/5016 704/272 |
| 2005/0078967 A1 * | 4/2005 | Fujimoto ............. G06F 11/0748 399/8 |
| 2013/0246923 A1 * | 9/2013 | Iwai ...................... H04L 67/125 715/736 |
| 2018/0239583 A1 * | 8/2018 | Castells De Monet ...................... G06F 3/1204 |
| 2019/0068809 A1 | 2/2019 | Shiga et al. |
| 2019/0096104 A1 * | 3/2019 | Dolce ....................... G06T 7/73 |
| 2020/0017069 A1 * | 1/2020 | Galan-Oliveras ............................ G06K 9/00838 |
| 2020/0076803 A1 * | 3/2020 | Saito ....................... G06F 3/167 |

FOREIGN PATENT DOCUMENTS

| JP | 2003058360 A | 2/2003 |
| JP | 2013220618 A | 10/2013 |
| JP | 2019046103 A | 3/2019 |

* cited by examiner

*Primary Examiner* — Mandrita Brahmachari
(74) *Attorney, Agent, or Firm* — Chip Law Group

(57) ABSTRACT

An image processing system includes an information processing apparatus and an image processing apparatus, and the information processing apparatus includes a first operation input portion that receives a first operation input, a second operation input portion that receives a second operation input, a first notification portion that performs a first notification, and a second notification portion that performs a second notification. The image processing system further includes a notification selection portion that selects at least one of the first notification portion and the second notification portion of the information processing apparatus as a destination to which a notification of a processing result regarding the image processing executed by the image processing apparatus is sent.

14 Claims, 5 Drawing Sheets

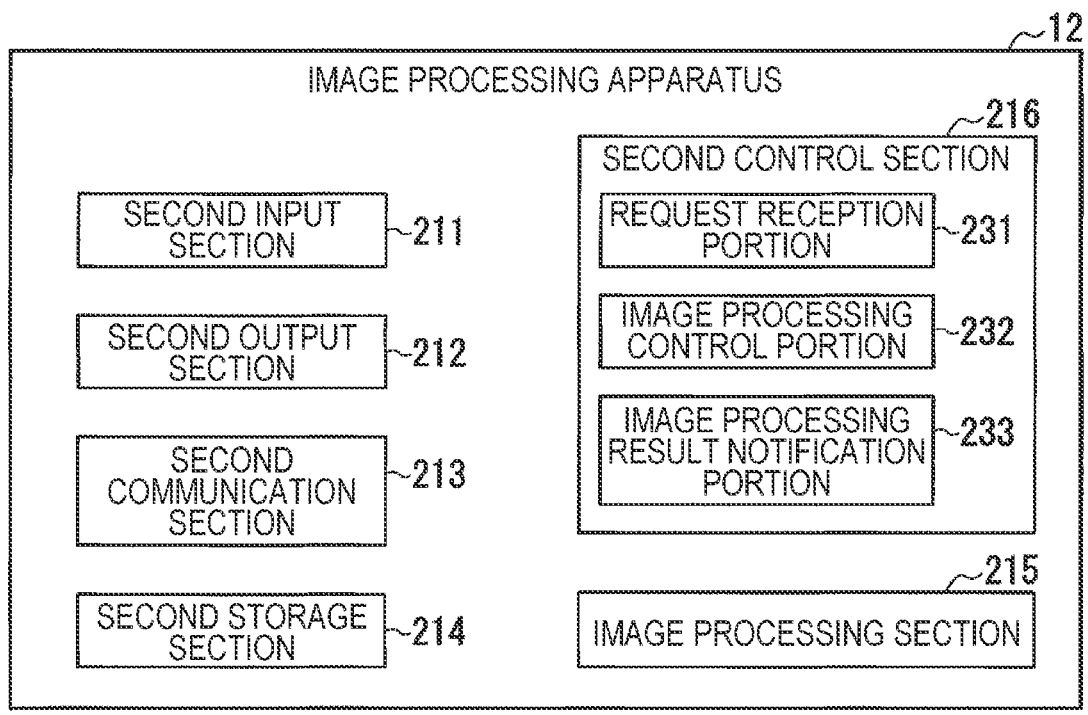
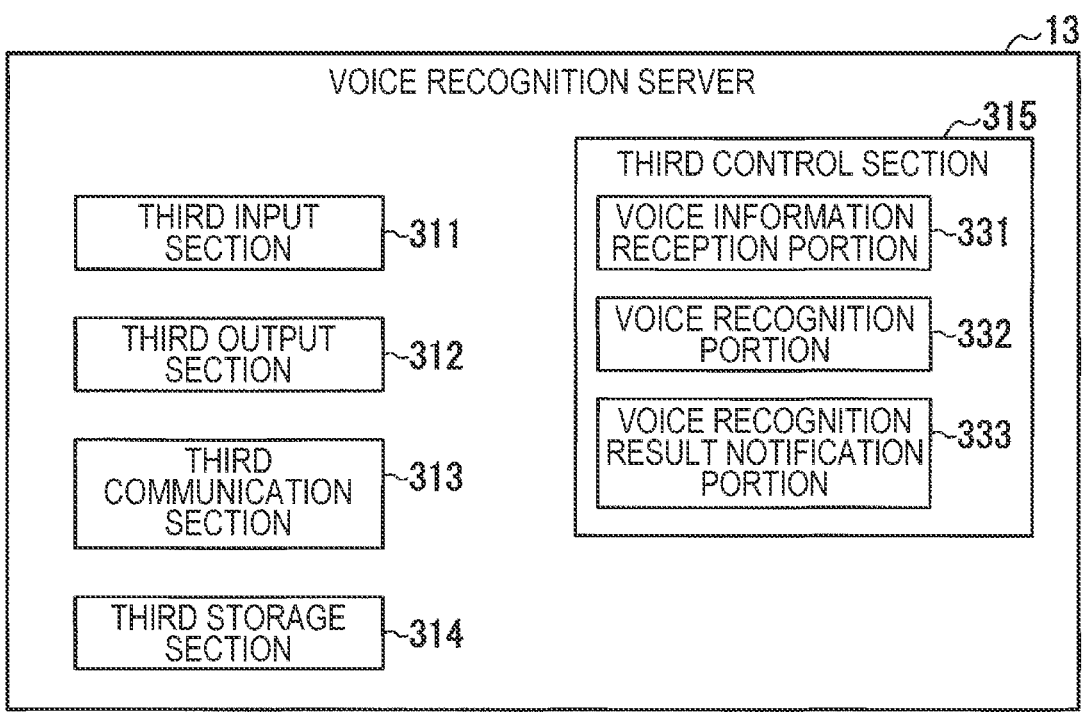

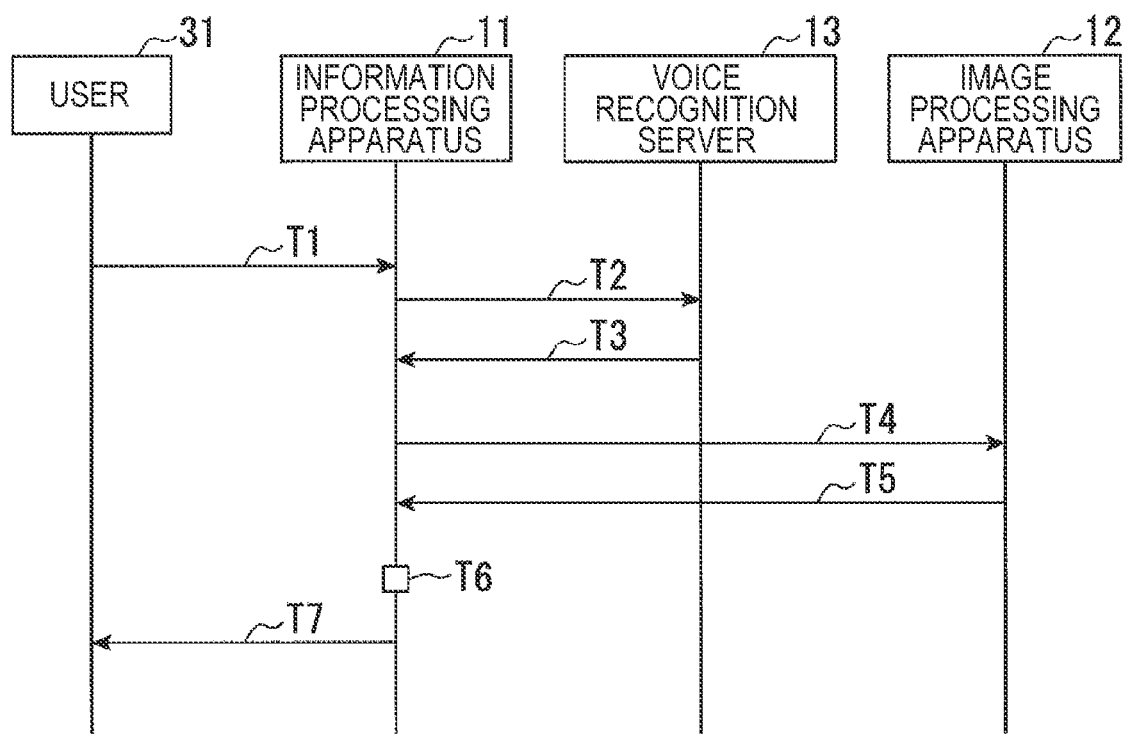

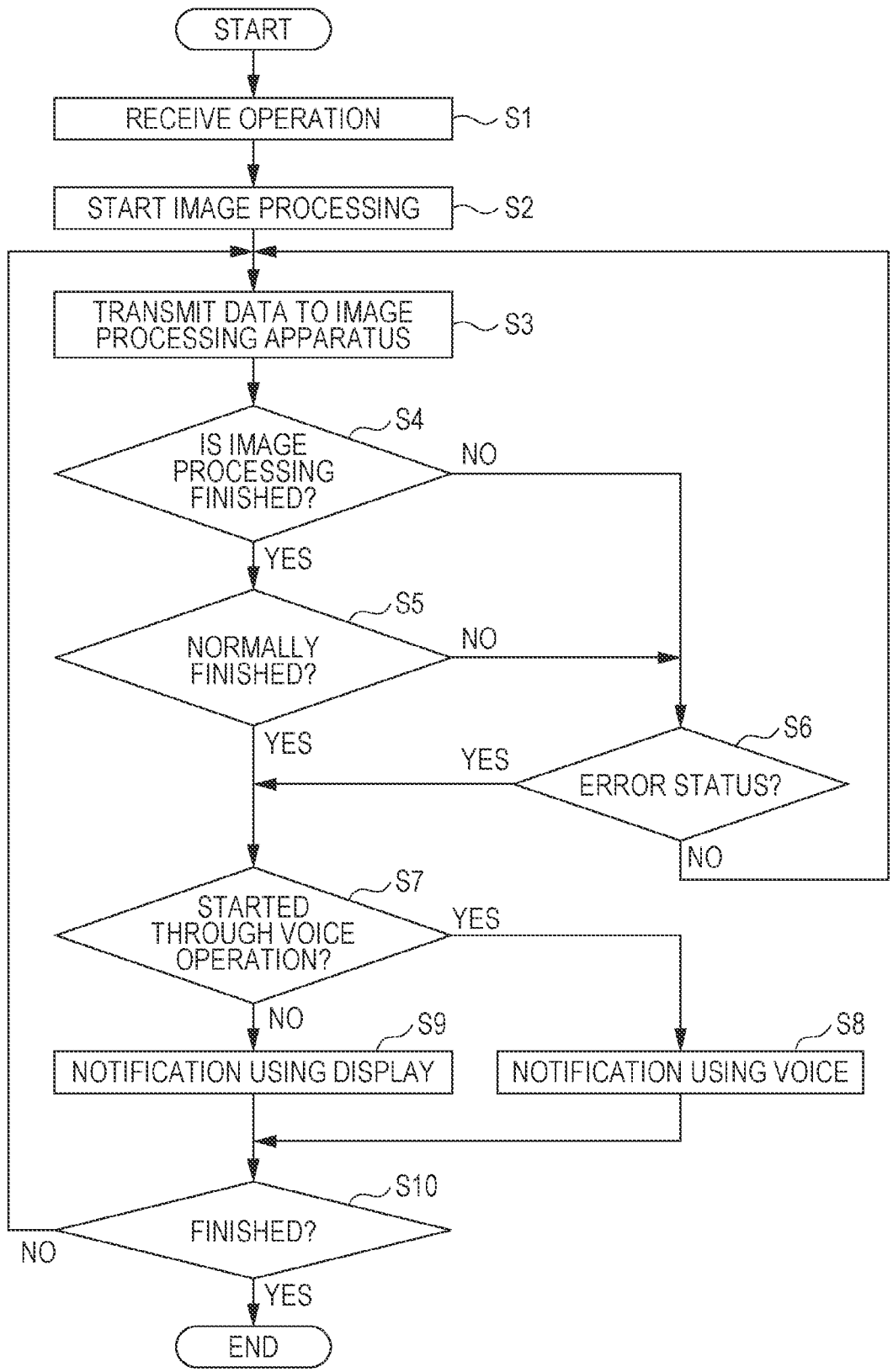

VOICE INTERACTION IN AN IMAGE PROCESSING SYSTEM

The present application is based on, and claims priority from JP Application Serial Number 2019-218612, filed Dec. 3, 2019, the disclosure of which is hereby incorporated by reference herein in its entirety.

BACKGROUND

1. Technical Field

The present disclosure relates to an image processing system, a control method for an information processing apparatus, and a non-transitory computer-readable storage medium storing a program.

2. Related Art

In recent years, portable devices such as smartphones have begun to have a mechanism for receiving other operations in addition to operations such as tapping a normal screen. The other operations include, for example, an operation of performing a search by using voice or an operation of starting an application by using voice.

For example, a print system has a function of starting a predetermined application by using voice and automatically printing a picture. With this function, printing may be executed by a print apparatus which is located away from a portable device and is coupled to the same access point as the portable device via Wi-Fi, or a print apparatus which is located away from the portable device and is coupled to the portable device via the Internet.

JP-A-2019-046103 discloses a configuration in which a print apparatus that receives a voice operation and performs printing is provided with a notification portion that performs a voice notification of print settings (refer to claim 16 in JP-A-2019-046103).

However, in the technique disclosed in JP-A-2019-046103, regarding voice control, a configuration of performing a notification by using voice is disclosed, but a relation with other notification portions such as a display is not disclosed.

SUMMARY

In order to solve the problem, according to an aspect, there is provided an image processing system including an information processing apparatus; and an image processing apparatus, in which the information processing apparatus includes a first operation input portion configured to receive a first operation input, a second operation input portion configured to receive a second operation input, a first notification portion configured to performs a first notification, a second notification portion configured to perform a second notification, an instruction acquisition portion configured to acquire an instruction for the image processing apparatus based on the first operation input received by the first operation input portion or the second operation input received by the second operation input portion, and an image processing request portion configured to request image processing to the image processing apparatus based on the instruction acquired by the instruction acquisition portion, the image processing apparatus includes a request reception portion configured to receive a request for the image processing from the information processing apparatus, and an image processing section configured to execute the image processing received by the request reception portion, and the image processing system further includes a notification selection portion configured to select at least one of the first notification portion and the second notification portion of the information processing apparatus as a destination to which a notification of a processing result regarding the image processing executed by the image processing apparatus is sent.

In order to solve the problem, according to another aspect, there is provided a control method for an information processing apparatus including a first operation input portion, a second operation input portion, a first notification portion, and a second notification portion, and performing communication with an image processing apparatus, the control method including acquiring an instruction for the image processing apparatus based on a first operation input received by the first operation input portion or a second operation input received by the second operation input portion; requesting image processing to the image processing apparatus based on the acquired instruction; and selecting at least one of the first notification portion and the second notification portion as a destination to which a notification of a processing result regarding the image processing executed by the image processing apparatus is sent.

In order to solve the problem, according to still another aspect, there is provided a non-transitory computer-readable storage medium storing a program executed in a computer configuring an information processing apparatus including a first operation input portion, a second operation input portion, a first notification portion, and a second notification portion, and performing communication with an image processing apparatus, the program causing the computer to acquire an instruction for the image processing apparatus based on a first operation input received by the first operation input portion or a second operation input received by the second operation input portion; request image processing to the image processing apparatus based on the acquired instruction; and select at least one of the first notification portion and the second notification portion as a destination to which a notification of a processing result regarding the image processing executed by the image processing apparatus is sent.

BRIEF DESCRIPTION OF THE DRAWINGS

FIG. 3 is a diagram illustrating a configuration of functional blocks of an image processing apparatus.

FIG. 4 is a diagram illustrating a configuration of functional blocks of a voice recognition server.

FIG. 5 is a diagram illustrating an example of correspondence information.

FIG. 6 is a diagram illustrating a sequence of processes performed in the image processing system.

FIG. 7 is a diagram illustrating an example of a procedure of processes performed in the information processing apparatus.

DESCRIPTION OF EXEMPLARY EMBODIMENTS

Hereinafter, embodiments will be described with reference to the drawings.

Figure 1:
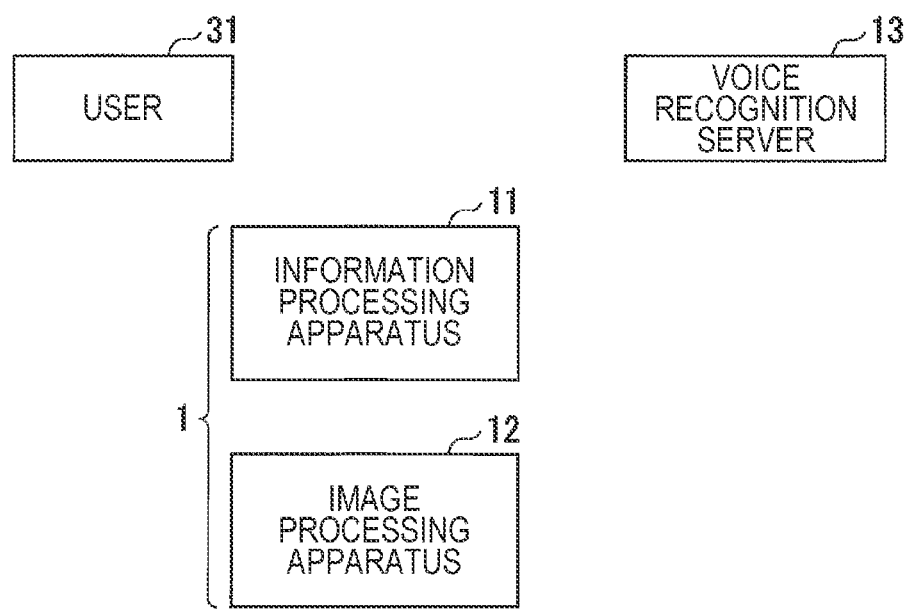
FIG. 1 is a diagram illustrating a schematic configuration of an image processing system.

FIG. 1 is a diagram illustrating a schematic configuration of an image processing system 1 according to the embodiment. The image processing system 1 includes an information processing apparatus 11 and an image processing apparatus 12. FIG. 1 illustrates a user 31 of the information processing apparatus 11 and a voice recognition server 13. The image processing system 1 may include the voice recognition server 13.

The information processing apparatus 11 can perform communication with each of the image processing apparatus 12 and the voice recognition server 13. In the present embodiment, the information processing apparatus 11 can directly access each of the image processing apparatus 12 and the voice recognition server 13. Here, the information processing apparatus 11 and the image processing apparatus 12 are coupled to each other in a wired or wireless manner, and perform communication with each other. Similarly, the information processing apparatus 11 and the voice recognition server 13 are coupled to each other in a wired or wireless manner, and perform communication with each other. The information processing apparatus 11, the image processing apparatus 12, and the voice recognition server 13 may be coupled to the same network. The network may be the Internet, for example. Further, the image processing apparatus 12 and the voice recognition server 13 may be capable of communicating by wire or wirelessly.

In the present embodiment, each of the information processing apparatus 11 and the voice recognition server 13 is a computer. The information processing apparatus 11 may be, for example, any computer such as a tablet terminal apparatus or a smartphone, or may be another apparatus. The information processing apparatus 11 is, for example, a smart speaker that supports interactive voice operations, and a device such as a display device having an operation input function and a notification function using transmission device other than voice may be used. The voice recognition server 13 may be, for example, a server that can be generally used via the Internet.

The image processing apparatus 12 may be, for example, a print apparatus that performs printing on paper or a scanner that reads an original document. The image processing apparatus 12 may be a multifunction peripheral including a print apparatus and a scanner.

Here, in the present embodiment, a case where print processing is used as image processing will be described. In the present embodiment, the image processing apparatus 12 is a print apparatus. The information processing apparatus 11 and the image processing apparatus 12 may be shared by a plurality of different users including the user 31. The image processing apparatus 12 may be shared by, for example, a plurality of information processing apparatuses including the information processing apparatus 11. The image processing is not limited to print processing, and may be applied to image reading using a scanner, copying using a copy function, or the like.

Figure 2:
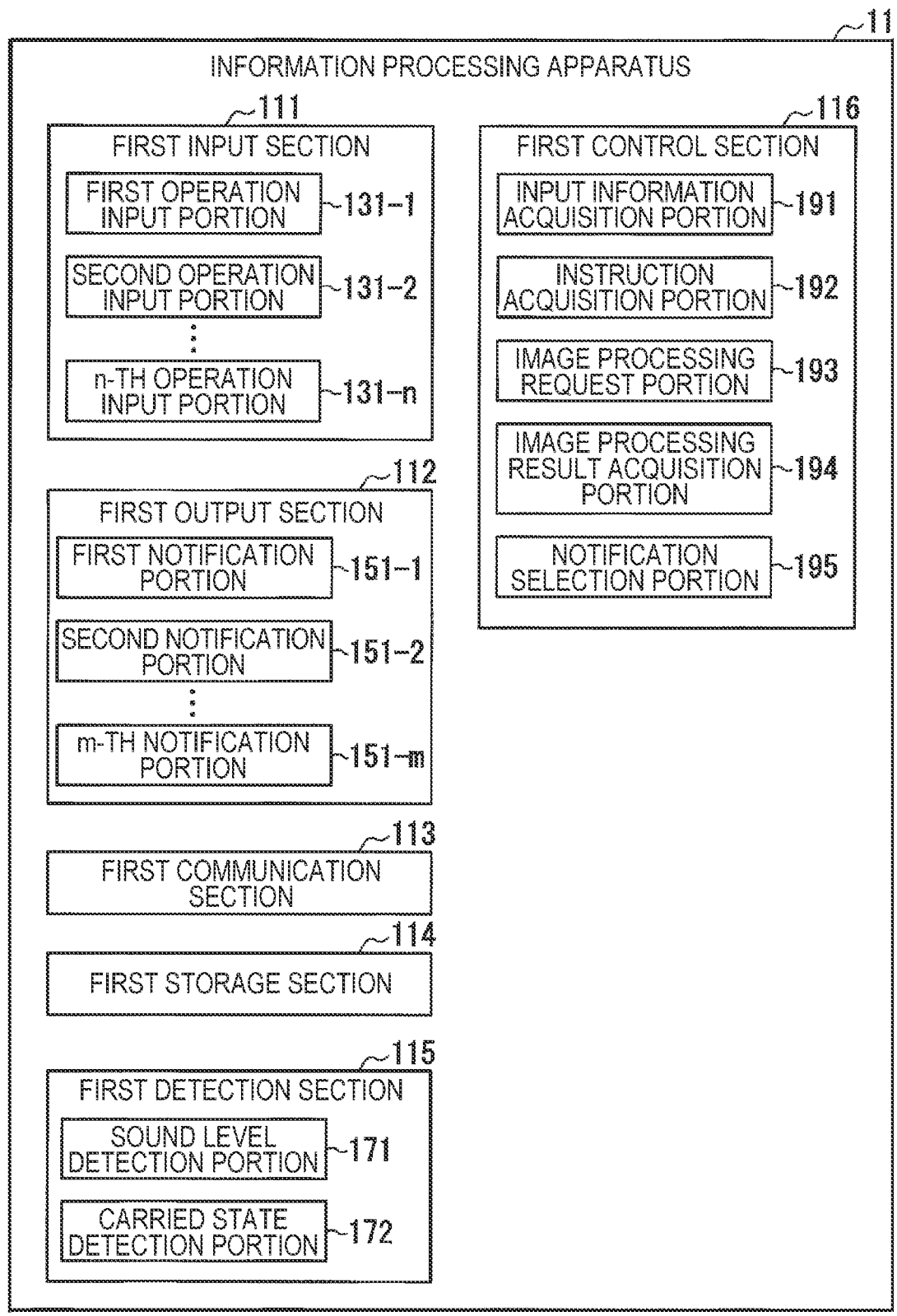
FIG. 2 is a diagram illustrating a configuration of functional blocks of an information processing apparatus.

FIG. 2 is a diagram illustrating a configuration of functional blocks of the information processing apparatus 11 according to the embodiment.

The information processing apparatus 11 includes a first input section 111, a first output section 112, a first communication section 113, a first storage section 114, a first detection section 115, and a first control section 116.

The first input section 111 includes a first operation input portion 131-1, a second operation input portion 131-2, ..., and an n-th operation input portion 131-$n$ as n operation input portions. Here, n represents an integer of 2 or greater. The first output section 112 includes a first notification portion 151-1, a second notification portion 151-2, ..., and an m-th notification portion 151-$m$ as m notification portions. Here, m represents an integer of 2 or greater. Here, n and m may have the same value or different values. The first detection section 115 includes a sound level detection portion 171 and a carried state detection portion 172. The first control section 116 includes an input information acquisition portion 191, an instruction acquisition portion 192, an image processing request portion 193, an image processing result acquisition portion 194, and a notification selection portion 195.

In the information processing apparatus 11, a central processing unit (CPU) executes a predetermined program stored in the first storage section 114 to perform various processes. Such programs include an application program for controlling image processing performed by the image processing apparatus 12, and an application program for controlling an aspect of performing a notification of information regarding the image processing. The programs may be, for example, separate programs or may be configured as an integrated program. The programs are installed in the information processing apparatus 11 in advance or at any timing.

The first input section 111 is an input interface that inputs various kinds of information. The first operation input portion 131-1 to the n-th operation input portion 131-$n$ receive operation inputs performed by the user 31 by using respective types of transmission means. Each of the first operation input portion 131-1 to the n-th operation input portion 131-$n$ may receive an operation input by using any transmission means. Each of the first operation input portion 131-1 to the n-th operation input portion 131-$n$ may receive an operation input by using different transmission means, or two or more of the first operation input portion 131-1 to the n-th operation input portion 131-$n$ may receive operation inputs by using the same transmission means.

The first operation input portion 131-1 receives an operation input by using voice as transmission means. For example, the first operation input portion 131-1 has a microphone, and receives information indicating the voice output from the user 31. In this case, the content of the voice is converted into the content of an operation. The second operation input portion 131-2 receives an operation input by using a manual operation as transmission means. For example, the second operation input portion 131-2 has an operation device such as a keyboard, a mouse, or a touch panel, and inputs information regarding a content of an operation on the operation device performed by the user 31. The third operation input portion 131-3 receives an operation input by using the captured image as transmission means. For example, the third operation input portion 131-3 has a camera, and receives information regarding a captured image of the user 31. In this case, a motion or a pose of the user 31 reflected in the image is converted into a content of the operation. The motion or the pose of the user 31 may be referred to as a gesture.

Here, for example, a device that acquires information for receiving an operation input by using each of the first operation input portion 131-1 to the n-th operation input portion 131-$n$ may be provided outside the information processing apparatus 11 instead of being provided in the information processing apparatus 11. A microphone that acquires voice information, an operation device that acquires information regarding a manual operation, a camera that acquires information about an image, and the like may be provided outside the information processing apparatus 11 instead of being provided in the information processing apparatus 11. In this case, each of the first operation input portion 131-1 to the n-th operation input portion 131-*n* inputs an operation by using each type of device provided outside the information processing apparatus 11.

Any type of transmission means for receiving an operation input in each of the first operation input portion 131-1 to the n-th operation input portion 131-*n* may be assigned, and the respective numbers of the first operation input portion 131-1 to the n-th operation input portion 131-*n* are examples and may be any numbers. In other words, voice, a manual operation, an image, or the like as the transmission means may be assigned to an operation input portion with any number among the first operation input portion 131-1 to the n-th operation input portion 131-*n*.

The first output section 112 is an output interface that outputs various types of information. The first notification portion 151-1 to the m-th notification portion 151-*m* notify the user 31 by using respective types of transmission means. A content of the notification is a content related to image processing, and may be a content related to a result of the image processing. Each of the first notification portion 151-1 to the m-th notification portion 151-*m* may perform a notification by using any transmission means. Each of the first notification portion 151-1 to the m-th notification portion 151-*m* may perform a notification by using different transmission means, or two or more of the first notification portion 151-1 to the m-th notification portion 151-*m* may perform notifications by using the same transmission means.

The first notification portion 151-1 performs a notification by using voice as transmission means. For example, the first notification portion 151-1 has a speaker, and outputs voice indicating a notification content from the speaker to perform a notification of the notification content. The second notification portion 151-2 performs a notification by using screen display as transmission means. For example, the second notification portion 151-2 has a screen, and outputs and displays information indicating a notification content on the screen to perform a notification of the notification content. The third notification portion 151-3 performs a notification by using vibration as transmission means. For example, the third notification portion 151-3 has a vibrator, and generates vibration according to information indicating a notification content with the vibrator to perform a notification of the notification content.

The device that outputs the information indicating the notification content by each of the first notification portion 151-1 to the m-th notification portion 151-*m* may be provided outside the information processing apparatus 11 instead of being provided in the information processing apparatus 11. For example, the speaker that outputs voice, the screen for displaying and outputting information, the vibrator for generating vibration, or the like may be provided outside the information processing apparatus 11 instead of being provided in the information processing apparatus 11. In this case, each of the first notification portion 151-1 to the m-th notification portion 151-*m* performs a notification by using each type of device provided outside the information processing apparatus 11.

Any type of transmission means for performing a notification in each of the first notification portion 151-1 to the n-th notification portion 151-*n* may be assigned, and the respective numbers of the first notification portion 151-1 to the n-th notification portion 151-*n* are examples and may be any numbers. In other words, the voice, the image, the vibration, and the like may be assigned to a notification portion having any number among the first notification portion 151-1 to the n-th notification portion 151-*n*.

The first communication section 113 is an interface that performs communication with other apparatuses. The first storage section 114 is a memory that stores various types of information. The first detection section 115 is a sensor that detects various types of information. The sound level detection portion 171 detects a sound volume level. The carried state detection portion 172 detects a state in which the information processing apparatus 11 is carried.

The first control section 116 is a controller including a processor and the like and performing various types of control. The input information acquisition portion 191 acquires information that is input by the first input section 111. The input information acquisition portion 191 acquires, for example, information regarding an operation input received by each of the first operation input portion 131-1 to the n-th operation input portion 131-*n*. The instruction acquisition portion 192 receives an instruction based on information acquired by the input information acquisition portion 191. The instruction is an instruction related to image processing. The instruction acquisition portion 192 exchanges information with the voice recognition server 13 as necessary.

The image processing request portion 193 requests image processing to the image processing apparatus 12 based on an instruction acquired by the instruction acquisition portion 192. The image processing result acquisition portion 194 acquires information regarding a processing result of the image processing performed by the image processing apparatus 12. The processing result of the image processing may include not only a final result of the image processing but also a result in the middle of the image processing. The notification selection portion 195 selects an aspect of performing a notification.

FIG. 3 is a diagram illustrating a configuration of functional blocks of the image processing apparatus 12 according to the embodiment. The image processing apparatus 12 includes a second input section 211, a second output section 212, a second communication section 213, a second storage section 214, an image processing section 215, and a second control section 216. The second control section 216 includes a request reception portion 231, an image processing control portion 232, and an image processing result notification portion 233.

The second input section 211 has an operation device operated by a user of the image processing apparatus 12. The operation device may be, for example, a key. The second output section 212 has a screen on which information is displayed, a speaker outputting sound, and the like. Screens of the second input section 211 and the second output section 212 may be integrated by using a touch panel. The second communication section 213 is an interface that performs communication with other apparatuses. The second storage section 214 is a memory that stores various types of information. The image processing section 215 executes predetermined image processing. In the present embodiment, the image processing section 215 executes print processing, and thus executes, for example, a process of printing a print target image on a medium such as paper.

The second control section 216 is a controller including a processor and the like and performing various types of control. The request reception portion 231 receives a request from the information processing apparatus 11. The request is, for example, a request for image processing. The request may include a setting content for image processing. The image processing control portion 232 controls the image processing section 215 and causes the image processing section 215 to execute image processing based on the request received by the request reception portion 231. The image processing result notification portion 233 notifies the information processing apparatus 11 of the processing result of the image processing. The processing result of the image processing may include not only a final processing result of the image processing but also a result in the middle of the image processing.

Here, in the present embodiment, for convenience of description, a case where the user 31 of the information processing apparatus 11 and the user of the image processing apparatus 12 are the same as each other will be described. These users may be different from each other.

FIG. 4 is a diagram illustrating a configuration of functional blocks of the voice recognition server 13 according to the embodiment. The voice recognition server 13 includes a third input section 311, a third output section 312, a third communication section 313, a third storage section 314, and a third control section 315. The third control section 315 includes a voice information reception portion 331, a voice recognition portion 332, and a voice recognition result notification portion 333.

The third input section 311 has an operation device operated by a manager of the voice recognition server 13. The operation device may be a keyboard or a mouse. The third output section 312 has a screen on which information is displayed, a speaker outputting sound, and the like. The third communication section 313 is an interface that performs communication with other apparatuses. The third storage section 314 is a memory that stores various types of information.

The third control section 315 is a controller including a processor and the like and performing various types of control. The voice information reception portion 331 receives voice information from the information processing apparatus 11. The voice recognition portion 332 performs a process of recognizing the voice on the voice information received by the voice information reception portion 331. The process is a process of analyzing the voice and specifying, for example, a content delivered by the voice. The content is a content for an instruction. The process includes a process or the like of identifying a person who emitted the voice. The voice recognition result notification portion 333 notifies the information processing apparatus 11 of information regarding the result of the process performed by the voice recognition portion 332.

FIG. 5 is a diagram illustrating an example of correspondence information 1011 according to the embodiment. The correspondence information 1011 is stored in the first storage section 114 of the information processing apparatus 11. The correspondence information 1011 may be stored in the first storage section 114 as a default setting in the information processing apparatus 11 in advance, or may be stored in the information processing apparatus 11 or the like at any timing. The correspondence information 1011 may be a content that is initially set by an application. The correspondence information 1011 stored in the first storage section 114 may be rewritten or erased according to the operation of the user 31 or automatically by the information processing apparatus 11. Each of the correspondences defined in the correspondence information 1011 may be managed in the information processing apparatus 11 in a state in which the correspondence is used at all times, or may be managed to be switchable between a used state and an unused state. The switching may be performed according to an operation performed by the user 31, or may be automatically performed by an apparatus such as the information processing apparatus 11.

The correspondence information 1011 stores a condition and a notification aspect in correlation with each other. The condition may be various conditions and may include, for example, an aspect for operation input. The notification aspect may be various notification aspects.

FIG. 5 illustrates examples of conditions and image processing settings. A condition such as an operation input using voice and a notification aspect such as a notification using voice are correlated with each other. The correlation is a correlation using an aspect of performing a notification using voice when the user 31 performs an operation input using voice. Here, the voice may be voice itself or voice data obtained by processing the voice. The voice includes information represented by the voice. Hereinafter, the voice or the voice data will be simply referred to as voice. A condition such as a manual operation input is correlated with a notification aspect of performing a notification using display. The correlation is a correlation using an aspect of performing a notification using display when the user 31 performs a manual operation input. A condition such as an operation input using an image is correlated with a notification aspect of performing a notification using voice and display. This correlation is a correlation using an aspect of performing a notification using both voice and display when the user 31 performs an operation input by using an image. As an aspect of performing an operation input using an image, an aspect of performing an operation input according to a motion or a pose of the user 31 reflected in the image may be used.

For convenience of description, FIG. 5 illustrates an example of a correspondence between a condition and a notification aspect, but various correspondences may be used. For example, the condition may include not only an aspect for operation input but also conditions regarding one or more elements such as information for identifying the user 31, a result of image processing performed by the image processing apparatus 12, a predetermined situation of the information processing apparatus 11, a time, the past history, and a situation of background sound. One condition may be a condition regarding one element, or a condition in which two or more elements are combined with each other. As the notification aspect, an aspect using one of notification methods such as voice or display may be used, or a notification aspect in which two or more notification methods are combined with each other may be used.

FIG. 6 is a diagram illustrating a sequence of processes performed in the image processing system 1 according to the embodiment. FIG. 6 schematically illustrates the user 31, the information processing apparatus 11, the image processing apparatus 12, and the voice recognition server 13. Process T1 to Process T7 will be described.

Process T1

The user 31 performs an operation input by using one or more of the first operation input portion 131-1 to the n-th operation input portion 131-*n*. The information processing apparatus 11 causes the input information acquisition portion 191 to acquire input information according to the operation input. Here, it is assumed that the operation input is an operation input using voice.

Process T2

When the input information acquisition portion 191 acquires voice input information, the information processing apparatus 11 causes the first communication section 113 to transmit the voice information to the voice recognition server 13. The voice recognition server 13 receives the voice information from the information processing apparatus 11 via the third communication section 313.

Process T3

The voice recognition server 13 causes the voice information reception portion 331 to receive the voice information received via the third communication section 313. The voice recognition server 13 causes the voice recognition portion 332 to recognize the voice information. The voice recognition server 13 transmits the recognition result of the voice information to the information processing apparatus 11 via the third communication section 313.

The information processing apparatus 11 receives the recognition result of the voice information from the voice recognition server 13 via the first communication section 113.

Process T4

The information processing apparatus 11 causes the instruction acquisition portion 192 to acquire an instruction corresponding to the voice information based on the recognition result of the voice information received via the first communication section 113. The information processing apparatus 11 causes the image processing request portion 193 to transmit information indicating a content of the instruction to the image processing apparatus 12 via the first communication section 113 based on the instruction acquired by the instruction acquisition portion 192, and thus requests the image processing apparatus 12 to perform image processing according to the instruction. The image processing apparatus 12 receives information indicating the content of the instruction from the information processing apparatus 11 via the second communication section 213.

The information processing apparatus 11 causes the image processing request portion 193 to transmit print target data to the image processing apparatus 12 via the first communication section 113. The data may be stored in an apparatus other than the information processing apparatus 11, for example. In this case, the image processing request portion 193 of the information processing apparatus 11 performs control such that the image processing apparatus 12 acquires the print target data. In an example, the information processing apparatus 11 may cause the image processing request portion 193 to transmit information indicating a storage location of the print target data to the image processing apparatus 12 via the first communication section 113. In this case, the request reception portion 231 of the image processing apparatus 12 receives the print target data from the storage location via the second communication section 213 based on information indicating the storage location. The storage location may be any apparatus other than the information processing apparatus 11. In another example, the image processing request portion 193 of the information processing apparatus 11 gives an instruction such that the print target data is transmitted to the image processing apparatus 12 from the storage location of the print target data. In this case, the print target data is transmitted from the storage location to the image processing apparatus 12. The storage location may be any apparatus other than the information processing apparatus 11.

Process T5

The image processing apparatus 12 causes the request reception portion 231 to receive the image processing request based on the information received via the second communication section 213. The image processing apparatus 12 controls the image processing section 215 by using the image processing control portion 232 based on the image processing request received via the request reception portion 231, and thus executes the image processing. The image processing apparatus 12 causes the image processing result notification portion 233 to transmit the processing result of the image processing to the information processing apparatus 11 via the second communication section 213, and thus notifies the information processing apparatus 11 of the image processing result. The information processing apparatus 11 receives the processing result of the image processing from the image processing apparatus 12 via the first communication section 113. The information processing apparatus 11 causes the image processing result acquisition portion 194 to acquire information indicating the processing result of the image processing based on the information received via the first communication section 113.

Process T6

The information processing apparatus 11 causes the notification selection portion 195 to select a notification aspect based on the correspondence information 1011.

Process T7

The information processing apparatus 11 notifies the user 31 of the processing result of the image processing by using the notification aspect selected by the notification selection portion 195 based on the information acquired by the image processing result acquisition portion 194. As the notification aspect, an aspect of one or more of the first notification portion 151-1 to the m-th notification portion 151-$m$ performing notifications is used. The information processing apparatus 11 causes the notification selection portion 195 to transmit a signal for performing a notification to a selected notification portion based on the result of the image processing performed by the image processing apparatus 12.

In the information processing apparatus 11, a case of performing an operation input using voice has been described, but, when there is another operation input, the following processes are performed instead of Processes T1 to T4. In other words, the information processing apparatus 11 causes the input information acquisition portion 191 to acquire input information according to the operation input. Here, it is assumed that the operation input is a manual operation input or the like. In Process T1, the information processing apparatus 11 causes the instruction acquisition portion 192 to acquire an instruction corresponding to the input information based on the input information acquired by the input information acquisition portion 191. In Process T4, the information processing apparatus 11 causes the image processing request portion 193 to transmit information indicating a content of the instruction to the image processing apparatus 12 via the first communication section 113 based on the instruction acquired by the instruction acquisition portion 192, and thus requests the image processing apparatus 12 to perform image processing corresponding to the instruction. The image processing apparatus 12 receives information indicating the content of the instruction from the information processing apparatus 11 via the second communication section 213. Here, Process T2 and Process T3 are not performed. The processes after Process T5 are performed.

FIG. 7 is a diagram illustrating an example of a procedure of processes performed in the information processing apparatus 11 according to the embodiment. In the example in FIG. 7, a case of a setting will be described in which a voice operation is performed on the information processing apparatus 11 by the user 31, and an instruction corresponding to the voice operation is received, a notification of result information corresponding to the instruction is performed by using voice. The content of this setting is stored in the correspondence information 1011. In the example in FIG. 7, a case of a setting is described in which, when a manual operation is performed on the information processing apparatus 11 by the user 31, and an instruction corresponding to the manual operation is received, a notification of result information corresponding to the instruction is performed by using display. The content of this setting is stored in the correspondence information 1011.

Step S1

In the information processing apparatus 11, the user 31 performs an operation input by using either the first operation input portion 131-1 corresponding to a voice operation or the second operation input portion 131-2 corresponding to a manual operation. In the information processing apparatus 11, the input information acquisition portion 191 acquires input information according to the operation input. In the information processing apparatus 11, the instruction acquisition portion 192 acquires an instruction according to the input information. Here, when the input information is voice information, in the information processing apparatus 11, the instruction acquisition portion 192 performs communication with the voice recognition server 13 to acquire an instruction according to the voice information.

The flow proceeds to a process in step S2.

Step S2

In the information processing apparatus 11, the image processing request portion 193 requests image processing according to the instruction to the image processing apparatus 12, and thus starts the image processing.

The flow proceeds to a process in step S3.

Step S3

In the information processing apparatus 11, the image processing request portion 193 transmits print target data to the image processing apparatus 12 via the first communication section 113. The flow proceeds to a process in step S4.

Step S4

In the information processing apparatus 11, the image processing result acquisition portion 194 determines whether or not the image processing requested to the image processing apparatus 12 is finished. As a result of the determination, in the information processing apparatus 11, when the image processing result acquisition portion 194 determines that the image processing requested to the image processing apparatus 12 is finished (step S4: YES), the flow proceeds to a process in step S5.

On the other hand, as a result of the determination, in the information processing apparatus 11, when the image processing result acquisition portion 194 determines that the image processing requested to the image processing apparatus 12 is not finished (step S4: NO), the flow proceeds to a process in step S6.

Here, the information processing apparatus 11 determines that the image processing is finished when the image processing result acquisition portion 194 receives information regarding the result of the image processing being finished from the image processing apparatus 12. On the other hand, the information processing apparatus 11 determines that the image processing is not finished when the image processing result acquisition portion 194 does not receive the information regarding the result of the image processing being finished from the image processing apparatus 12.

Step S5

The information processing apparatus 11 causes the image processing result acquisition portion 194 to determine whether or not the image processing requested to the image processing apparatus 12 is normally finished. As a result of the determination, when the information processing apparatus 11 causes the image processing result acquisition portion 194 to determine that the image processing requested to the image processing apparatus 12 is normally finished (step S5: YES), the flow proceeds to a process in step S7. On the other hand, as a result of the determination, when the information processing apparatus 11 causes the image processing result acquisition portion 194 to determine that the image processing requested to the image processing apparatus 12 is not normally finished (step S5: NO), the flow proceeds to a process in step S6.

For convenience of description, it is assumed that a case where the image processing is finished but the image processing is not normally finished is a case where the image processing is abnormally finished. Information regarding the processing result of the image processing of which the image processing apparatus 12 notifies the information processing apparatus 11 is assumed to include information for identifying whether the image processing is normally finished or the image processing is abnormally finished.

Step S6

The information processing apparatus 11 causes the image processing result acquisition portion 194 to determine whether or not the image processing requested to the image processing apparatus 12 is in an error status. The status may be a status of the image processing apparatus 12. As a result of the determination, when the information processing apparatus 11 causes the image processing result acquisition portion 194 to determine that the image processing requested to the image processing apparatus 12 is in the error status (step S6: YES), the flow proceeds to a process in step S7. On the other hand, as a result of the determination, when the information processing apparatus 11 causes the image processing result acquisition portion 194 to determine that the image processing requested to the image processing apparatus 12 is not in the error status (step S6: NO), the flow proceeds to the process in step S3.

Here, when the flow proceeds from the process in step S5 to the process in step S6, it is assumed that the image processing is in an error status. In other words, abnormal finishing of the image processing is a kind of error. When the flow proceeds from the process in step S4 to the process in step S6, it is assumed that the image processing may be in an error status. Various errors may be used as the error in this case. For example, as the error in this case, there may be the use of an error that the image processing is not finished when a predetermined time has elapsed after the information processing apparatus 11 requested the image processing to the image processing apparatus 12. The predetermined time is a timeout time.

Step S7

The information processing apparatus 11 causes the notification selection portion 195 to determine whether or not the present image processing has been started through a voice operation. As a result of the determination, when the information processing apparatus 11 causes the notification selection portion 195 to determine that the present image processing has been started through the voice operation (step S7: YES), the flows proceeds to a process in step S8. On the other hand, as a result of the determination, when the information processing apparatus 11 causes the notification selection portion 195 to determine that the present image processing has not been started through the voice operation (step S7: NO), the flows proceeds to a process in step S9. In the example in FIG. 7, the case where the image processing has not been started through the voice operation is a case where the image processing has been started through a manual operation.

Step S8

The information processing apparatus 11 causes notification selection portion 195 to select a notification using voice.

The information processing apparatus 11 causes the first notification portion 151-1 corresponding to the voice to output information regarding the result of the present image processing by using the voice, and thus notifies the user 31 of the information. Here, a content of the notification may be various contents, such as a content indicating that the present image processing is normally finished, or a content related to an error. The flow proceeds to a process in step S10.

Step S9

The information processing apparatus 11 causes the notification selection portion 195 to select a notification using display.

The information processing apparatus 11 causes the second notification portion 151-2 corresponding to the display to output information regarding the result of the present image processing by using the display, and thus notifies the user 31 of the information. Here, a content of the notification may be various contents, such as a content indicating that the present image processing is normally finished, or a content related to an error. The flow proceeds to a process in step S10.

Step S10

The information processing apparatus 11 causes the image processing result acquisition portion 194 to determine whether or not overall image processing is finished. As a result of the determination, when the image processing result acquisition portion 194 determines that all the image processing is finished (step S10: YES), the information processing apparatus 11 finishes the process in the flow. On the other hand, as a result of the determination, when the image processing result acquisition portion 194 determines that at least part of the image processing is not finished (step S10: NO), the information processing apparatus 11 proceeds to the process in step S3.

The error may include an error due to which image processing cannot be continued and an error due to which image processing can be continued. In a specific example, when an error that requires resetting of the image processing apparatus 12 occurs during image processing, typically, it is not possible to continue the image processing from the middle thereof. When an error such as paper exhaustion occurs during printing as image processing, the image processing can be continued from the middle thereof.

Here, a case has been described in which print target data is sequentially transmitted by predetermined part from the information processing apparatus 11 to the image processing apparatus 12, and the image processing apparatus 12 sequentially prints the predetermined part. On the other hand, in another configuration example, the image processing apparatus 12 may print data after overall print target data is transmitted from the information processing apparatus 11 to the image processing apparatus 12. In this case, in the case of (step S6: NO), the flow proceeds to the process in step S4 instead of the process in step S3. In this case, the process in step S10 may not be provided, and the process in the flow may be finished after the process in step S8 is finished and after the process of step S9 is finished.

As described above, in the information processing apparatus 11 according to the present embodiment, an application for controlling a notification aspect determines whether an operation on a print application is started by using voice or an operation other than the voice. In the example in FIG. 7, a manual operation is described as an operation other than voice. The information processing apparatus 11 checks a status of the image processing apparatus 12 during print processing. Here, the term "during print processing" refers to a period from the time when print data is sent to the image processing apparatus 12 to the time when printing of the print data is finished by the image processing apparatus 12. When the information processing apparatus 11 determines that an error has occurred based on the status during the print processing, the information processing apparatus 11 performs a notification of a content of the error. In this case, the information processing apparatus 11 performs a notification by using voice when an operation is started by using voice, and performs a notification by using screen display in other cases. Also when printing is finished, the information processing apparatus 11 performs a notification of print finishing by using voice in a case where an operation is started by using voice, and performs a notification of print finishing by using screen display in other cases. The information processing apparatus 11 determines print finishing based on the change in status. The status of the image processing apparatus 12 is busy when printing is in progress without an error, and is idle when printing is finished.

Here, a configuration in which the information processing apparatus 11 requests voice recognition to the voice recognition server 13 has been described, but, in another example, a configuration in which the image processing apparatus 12 requests voice recognition to the voice recognition server 13 may be used. The information processing apparatus 11 causes the instruction acquisition portion 192 to transmit voice information acquired by the input information acquisition portion 191 to the image processing apparatus 12 via the first communication section 113. The image processing apparatus 12 receives the voice information from the information processing apparatus 11 via the second communication section 213. The image processing apparatus 12 causes the request reception portion 231 to transmit the received voice information to the voice recognition server 13 via the second communication section 213. In the image processing apparatus 12, the request reception portion 231 receives information indicating the recognition result of the voice information from the voice recognition server 13 via the second communication section 213. In the image processing apparatus 12, the request reception portion 231 receives a request for image processing based on the information.

Although the configuration in which the information processing apparatus 11 receives an operation input using voice performed by the user 31 has been described, in another example, a configuration in which the image processing apparatus 12 receives an operation input using voice performed by the user 31 may be used. In the image processing apparatus 12, the second input section 211 receives an operation input using voice performed by the user 31. The image processing apparatus 12 causes the request reception portion 231 to transmit received voice information to the voice recognition server 13 via the second communication section 213. The image processing apparatus 12 causes the request reception portion 231 to receive information indicating the recognition result of the voice information from the voice recognition server 13 via the second communication section 213. In the image processing apparatus 12, the request reception portion 231 receives a request for image processing based on the information.

Another example of a correspondence between a condition and a notification aspect as illustrated in FIG. 5 will be described. In an example, the information processing apparatus 11 may perform control for changing a volume level of output voice according to noise around the information processing apparatus 11 when a notification is executed by using voice. In this case, the level of the noise is used as a condition, and a volume level of voice used for the notification is a notification aspect. The volume level of voice may be simply referred to as a volume or the like. In a specific example, the information processing apparatus 11 causes the sound level detection portion 171 to detect a level of surrounding sound. The information processing apparatus 11 causes the notification selection portion 195 to decrease a volume level of the notification voice as the detected sound level becomes lower, and to increase a volume level of notification voice as the detected sound level becomes higher.

Alternatively, the information processing apparatus 11 causes the notification selection portion 195 to compare the detected sound level with a predetermined threshold value, and sets a level of notification voice to a predetermined low volume level when the detected sound level is equal to or lower than the threshold value, and sets the level of notification voice to a predetermined high volume level when the detected sound level is more than the threshold value. Two or more threshold values may be provided, and volume levels of notification voice may be switched in three or more steps. In a case where such a correspondence is used, a volume level of notification voice decreases when a level of surrounding noise is low, and a volume level of the notification voice increases when a level of surrounding noise is high.

In another example, by using the notification selection portion 195, the information processing apparatus 11 may perform control using an aspect of performing a notification by using voice when a detected sound level is equal to or less than a predetermined threshold value, and performing a notification by using both vibration and screen display when the detected sound level exceeds the threshold value.

Here, as noise included in voice, sound other than voice of persons including the user 31 may be used, or sound other than voice of the user 31 may be used. Sound in a predetermined frequency region may be used as noise included in voice. As the predetermined frequency region, a region out of a main region in a human voice frequency region may be used. Noise may be referred to as unwanted sound, background sound, or the like.

The notification selection portion 195 selects a notification aspect using transmission means other than voice when a level of noise included in the voice exceeds a first threshold value based on an operation input using the voice. Here, the first threshold value may be any value, and an upper limit value of a noise level allowed for a notification using voice may be used. In an example, when a noise level is high, it is considered that a notification using screen display or the like is more preferably used than a notification using voice.

The notification selection portion 195 selects a notification aspect using voice with a level lower than a third threshold value when a level of the voice is less than a second threshold value, based on an operation input using the voice. The second threshold value may be any value. In an example, when the volume level in the operation input voice is low, it may be possible to notify the user 31 of a content of a notification through a notification using the low voice. The third threshold value may be any value, and the same value as the second threshold value may be used, or a value that is different from the second threshold value may be used. The voice with the level less than the third threshold value may be voice with any level. The voice with the level less than the third threshold value may be changed according to a level of noise. The voice with the level less than the third threshold value may be voice with a level higher than a level of noise.

The notification selection portion 195 selects a notification aspect using both of voice and transmission means other than the voice when a level of the voice is less than the second threshold value, based on an operation input using the voice. In an example, when a volume level of the voice in the operation input is low, it may be possible to notify the user 31 of a notification content through a notification using the low voice, but, at the same time, it may be possible to reliably notify the user 31 of the notification content through a notification using screen display or the like.

In an example, the information processing apparatus 11 may perform control using an aspect of performing a notification by using vibration when it is determined that a condition that the information processing apparatus 11 is worn by the user 31 is satisfied regardless of the type of operation input serving as a trigger to start image processing. The type of operation input indicates types such as a voice operation input and a manual operation input. In this case, the information processing apparatus 11 is, for example, a portable apparatus that can be worn by the user 31. The information processing apparatus 11 causes the carried state detection portion 172 to determine whether or not the information processing apparatus 11 is worn by the user 31. Various sensors may be used as the carried state detection portion 172.

As a condition that the information processing apparatus 11 is worn by the user 31, a condition that the information processing apparatus 11 is worn by the specific user 31 may be used. In this case, the information processing apparatus 11 has a function of determining whether or not a certain user 31 is the specific user 31.

In the information processing apparatus 11, a notification content and a vibration pattern may be correlated with each other. A vibration pattern for a notification of normal finishing may be different from a vibration pattern for a notification of abnormal finishing. Thus, the user 31 wearing the information processing apparatus 11 can recognize the presence or absence of an error according to a vibration pattern without receiving a notification using screen display. This is particularly effective when the user 31 cannot view a screen.

The information processing apparatus 11 may perform control using an aspect of performing a notification by using voice when it is determined that a condition that the information processing apparatus 11 is not worn by the user 31 is satisfied regardless of the type of operation input serving as a trigger to start image processing.

The information processing apparatus 11 may perform control using an aspect of performing a notification by using screen display when it is determined that a condition that the user 31 is viewing the information processing apparatus 11 is satisfied regardless of the type of operation input serving as a trigger to start image processing. Here, the information processing apparatus 11 includes a camera that captures surroundings of the information processing apparatus 11, and determines whether or not the user 31 is viewing the information processing apparatus 11 based on an image captured by the camera. The determination may be performed based on a result of detecting a visual line of the eyes of the user 31 reflected in the image. The camera may have any one of the third operation input portion 131-3 to the n-th operation input portion 131-*n*. As a condition that the user 31 is viewing the information processing apparatus 11, a condition that the user 31 is gazing at the information processing apparatus 11 may be used. The information processing apparatus 11 may use an aspect of determining that the user 31 is gazing at the information processing apparatus 11 when a time for which the user 31 is continuously or intermittently viewing the information processing apparatus 11 exceeds a predetermined threshold value.

As a condition that the user 31 is viewing the information processing apparatus 11, for example, a condition that the specific user 31 is viewing the information processing apparatus 11 may be used, and, in this case, the information processing apparatus 11 has a function of determining whether or not the user 31 is a specific person.

The information processing apparatus 11 may perform control using an aspect of performing a notification by using both of voice and screen display when it is determined that a condition that a notification of abnormality is performed is satisfied regardless of the type of operation input serving as a trigger to start image processing.

The information processing apparatus 11 may perform control using an aspect of performing a notification by using one or both of screen display and vibration when image processing is started through an operation input using voice in a case where it is determined that a condition that the information processing apparatus 11 is in a predetermined mode is satisfied. Here, the predetermined mode may be a mode in which sound output is turned off, that is, a so-called manner mode. In the predetermined mode, for example, a notification using vibration may be turned on.

The information processing apparatus 11 may perform control using an aspect of performing a notification by using the same type of transmission means as the type of transmission means by using which an operation input has been performed. In this case, the information processing apparatus 11 may not perform a notification by using the type of transmission means different from the type of the transmission means by using which the operation input has been performed. Here, the transmission means represents voice, screen display, or the like. The information processing apparatus 11 may perform control using an aspect of performing a notification by using vibration in a case of a normal operation and performing a notification by using voice in a case of an abnormal operation. The information processing apparatus 11 may perform control using an aspect of performing a notification by using predetermined transmission means based on a default setting that is set by the user 31. There may be a configuration in which the information processing apparatus 11 causes the notification selection portion 195 to select a notification aspect according to a condition including a result of the identification of the user 31 performed based on the voice of the user 31. The identification of the user 31 may be performed by the information processing apparatus 11 or the voice recognition server 13.

A notification snooze function will be described. The information processing apparatus 11 may have a snooze function for notification.

A description will be made of the snooze function when a notification using voice is performed. When a reaction of the user 31 is not detected after a notification is performed by using voice, the information processing apparatus 11 repeatedly performs the notification by using voice or the like after a predetermined time. Here, the reaction of the user 31 is a voice response made by the user 31, or screen tapping performed by the user 31. Such a reaction of the user 31 may be detected by one or more of the first operation input portion 131-1 to the n-th operation input portion 131-*n*.

A description will be made of the snooze function when a notification using screen display is performed. When a reaction of the user 31 is not detected after a notification is performed by using screen display, the information processing apparatus 11 performs a notification by using voice after a predetermined time. Here, the reaction of the user 31 is, for example, screen tapping performed by the user 31. Thereafter, the information processing apparatus 11 repeatedly performs the notification by using voice after a predetermined time, when the reaction of the user 31 is not detected after the notification by using voice is performed.

With the snooze function, any time may be set as a predetermined time corresponding to a time interval between a certain notification and the next notification. The predetermined time may be a fixed time or may be a time that changes according to the number of repeatedly performed notifications. The predetermined time may be set to be longer as the number of repeatedly performed notifications increases. Any number of repeatedly performed notifications may be set.

Another example of an apparatus having the voice recognition function will be described. The information processing apparatus 11 may have the voice recognition function. In this case, the information processing apparatus 11 performs voice recognition based on voice information acquired by the input information acquisition portion 191. The information processing apparatus 11 causes the instruction acquisition portion 192 to acquire an instruction based on the recognition result of the voice. In such a configuration, the voice recognition server 13 may not be used.

The image processing apparatus 12 may have the voice recognition function. In this case, for example, the information processing apparatus 11 causes the instruction acquisition portion 192 to transmit the voice information acquired by the input information acquisition portion 191 to the image processing apparatus 12 via the first communication section 113. The image processing apparatus 12 receives the voice information from the information processing apparatus 11 via the second communication section 213. The image processing apparatus 12 performs voice recognition based on the received voice information. The image processing apparatus 12 causes the request reception portion 231 to receive a request for image processing based on the recognition result of the voice. In such a configuration, the voice recognition server 13 may not be used.

Another example of an apparatus having a function of selecting a notification aspect by using the notification selection portion 195 will be described. Here, this function will be referred to as a notification aspect selection function. The voice recognition server 13 may have the notification aspect selection function. In this case, the information processing apparatus 11 causes the instruction acquisition portion 192 to transmit information required to select a notification aspect by using the notification aspect selection function to the voice recognition server 13 via the first communication section 113. The voice recognition server 13 receives the information from the information processing apparatus 11 via the third communication section 313, selects a notification aspect by using the notification aspect selection function based on the received information, and transmits aspect information indicating the selected notification aspect to the information processing apparatus 11 via the third communication section 313. The information processing apparatus 11 receives the information from the voice recognition server 13 via the first communication section 113, and causes the instruction acquisition portion 192 to specify the notification aspect based on the received information.

The image processing apparatus 12 may have the notification aspect selection function. In this case, the information processing apparatus 11 causes the instruction acquisition portion 192 to transmit, to the image processing apparatus 12 via the first communication section 113, information required to select a notification aspect by using the notification aspect selection function. The image processing apparatus 12 receives the information from the information processing apparatus 11 via the second communication section 213, selects a notification aspect by using the notification aspect selection function based on the received information, and transmits information indicating the selected aspect information to the information processing apparatus 11 via the second communication section 213. The information processing apparatus 11 receives the information from the image processing apparatus 12 via the first communication section 113, and causes the instruction acquisition portion 192 to specify the notification aspect based on the received information.

A separate apparatus may have the notification aspect selection function. The separate apparatus is an apparatus that is different from the information processing apparatus 11, the image processing apparatus 12, and the voice recognition server 13. In this case, the separate apparatus may be included in the image processing system 1. The information processing apparatus 11 causes the instruction acquisition portion 192 to transmit the information required to select a notification aspect by using the notification aspect selection function to the separate apparatus via the first communication section 113. The separate apparatus receives the information from the information processing apparatus 11, selects a notification aspect by using the notification aspect selection function based on the received information, and transmits information indicating the selected notification aspect to the information processing apparatus 11. The information processing apparatus 11 receives the information from the separate apparatus via the first communication section 113, and causes the instruction acquisition portion 192 to specify the notification aspect based on the received information.

As described above, the image processing system 1 according to the present embodiment includes the information processing apparatus 11 and the image processing apparatus 12, and has the following configuration. The information processing apparatus 11 includes the first operation input portion 131-1 that receives a first operation input, the second operation input portion 131-2 that receives a second operation input, the first notification portion 151-1 that performs a first notification, the second notification portion 151-2 that performs a second notification, the instruction acquisition portion 192 that acquires an instruction for the image processing apparatus 12 based on at least one of the first operation input received by the first operation input portion 131-1 and the second operation input received by the second operation input portion 131-2, and the image processing request portion 193 that requests image processing to the image processing apparatus 12 based on the instruction acquired by the instruction acquisition portion 192. Here, the first operation input is an operation input received by the first operation input portion 131-1. The second operation input is an operation input received by the second operation input portion 131-2. The first notification is a notification performed by the first notification portion 151-1. The second notification is a notification performed by the second notification portion 151-2. The image processing apparatus 12 also includes the request reception portion 231 that receives a request for image processing from the information processing apparatus 11, and an image processing section 215 that executes the image processing received by the request reception portion 231. The image processing system 1 includes the notification selection portion 195 that selects at least one of the first notification portion 151-1 and the second notification portion 151-2 of the information processing apparatus 11 as a destination to which a notification of information regarding the image processing executed in the image processing apparatus 12 is sent.

For example, when the user 31 performs an operation by using voice, situations may occur in which the user 31 cannot view a screen of a portable device such as a smartphone, the user 31 cannot manually operate the portable device, or the user 31 does not want the above situations. In the related art, even in such situations, when printing is finished in a print apparatus or an error occurs during print processing, the user 31 views a state of a main panel of the print apparatus or the portable device, but cannot check a situation of the print processing. This is a constraint that is impossible for the user 31 when the print apparatus is far away, and an execution result of print processing cannot be checked in a state in which the screen of the portable device cannot be viewed, which is thus inconvenient for the user 31. In the image processing system 1 according to the present embodiment, it is possible to perform a notification of image processing in a notification aspect that is convenient for the user 31. The image processing system 1 that controls the image processing apparatus 12 by using the information processing apparatus 11 that receives a plurality of different types of operation inputs may give a response to the user 31 in a notification aspect supposed to be desirable to the user 31. In the image processing system 1 according to the present embodiment, for example, it is possible to notify the user 31 in a notification aspect supposed to be desirable according to the type of operation input used by the user 31.

In the image processing system 1 according to the present embodiment, the first operation input portion 131-1 is an operation input using voice. Therefore, in the image processing system 1 according to the present embodiment, when the user 31 performs an operation input by using voice, the user 31 can be notified in an appropriate notification aspect.

In the image processing system 1 according to the present embodiment, the first notification portion 151-1 performs a first notification by using voice, and the second notification portion 152-2 performs a second notification by using transmission means other than the voice. Therefore, in the image processing system 1 according to the present embodiment, it is possible to perform a notification in a notification aspect appropriate for the user 31 by selectively using a notification using voice and a notification using transmission means other than the voice.

In the image processing system 1 according to the present embodiment, the notification selection portion 195 performs selection based on voice information that is input to the first operation input portion 131-1. Therefore, in the image processing system 1 according to the present embodiment, when the user 31 performs an operation input by using voice, the user 31 can be notified in a notification aspect appropriate for the user 31 based on a content of the voice.

In the image processing system 1 according to the present embodiment, the notification selection portion 195 selects the second notification portion 151-2 when a level of noise included in voice exceeds the first threshold value based on voice information that is input to the first operation input portion 131-1. Therefore, in the image processing system 1 according to the present embodiment, when the user 31 performs an operation input by using a voice, it is possible to perform a notification in a notification aspect appropriate for the user 31 based on a level of noise included in the voice. When a level of noise included in voice in the operation input is high, a notification is performed by using transmission means other than the voice.

In the image processing system 1 according to the present embodiment, the notification selection portion 195 selects the first notification portion 151-1 when a level of voice is less than the second threshold value based on information regarding the voice that is input to the first operation input portion 131-1. The first notification portion 151-1 performs the first notification by using voice with a level less than the third threshold value. Therefore, in the image processing system 1 according to the present embodiment, when the user 31 performs an operation input by using voice, it is possible to perform a notification in a notification aspect appropriate for the user 31 based on a level of the voice. In a specific example, when voice in an operation input is low, a notification is performed by using low voice sufficient for the user 31 to hear.

In the image processing system 1 according to the present embodiment, the notification selection portion 195 selects both the first notification portion 151-1 and the second notification portion 151-2 when a volume level of voice is less than the second threshold value based on voice information that is input to the first operation input portion 131-1. Therefore, in the image processing system 1 according to the present embodiment, when the user 31 performs an operation input by using a voice, it is possible to perform a notification in a notification aspect appropriate for the user 31 based on a volume level of the voice. When voice in an operation input is low, a notification is performed by using low voice, and a notification is also performed by using transmission means other than the voice.

In the image processing system 1 according to the present embodiment, the notification selection portion 195 selects the first notification portion 151-1 when the first operation input portion 131-1 receives the first operation input. Therefore, in the image processing system 1 according to the present embodiment, when the user 31 performs an operation input by using voice, it is possible to perform a notification in a notification aspect using the voice. When the user 31 performs an operation input by using voice, it may be difficult for the user 31 to view screen display, and thus a notification using the voice is performed.

In the image processing system 1 according to the present embodiment, when the first operation input portion 131-1 receives the first operation input, the notification selection portion 195 causes the second notification portion 151-2 not to perform the second notification. Therefore, in the image processing system 1 according to the present embodiment, when the user 31 performs an operation input by using voice, it is estimated that a notification using transmission means other than the voice is unnecessary, and a notification may not be performed in a notification aspect by using transmission means other than the voice.

In the image processing system 1 according to the present embodiment, a notification using voice may be performed only when the user 31 performs an operation input by using voice. In this case, in a situation where checking using voice is required for the user 31 while suppressing unnecessary voice notification, the user 31 can check messages related to an error during execution of image processing, finishing of image processing, and the like by using voice without changing setting, and thus convenience for the user 31 is improved.

In the image processing system 1 according to the present embodiment, the notification selection portion 195 performs selection based on a result of image processing. Therefore, in the image processing system 1 according to the present embodiment, it is possible to perform a notification in a notification aspect appropriate for the user 31 based on the result of the image processing.

In the image processing system 1 according to the present embodiment, the second operation input is a manual operation input. Therefore, in the image processing system 1 according to the present embodiment, it is possible to perform a notification in a notification aspect appropriate for the user 31 according to a manual operation input performed by the user 31. For example, in the image processing system 1, it is possible to selectively use a notification aspect according to a voice operation input and a manual operation input performed by the user 31.

In the image processing system 1 according to the present embodiment, the second operation input is an operation input using a captured image. Therefore, in the image processing system 1 according to the present embodiment, it is possible to perform a notification in a notification aspect appropriate for the user 31 according to an operation input using an image performed by the user 31. In the image processing system 1, it is possible to selectively use a notification aspect according to an operation input using voice and an operation input using an image performed by the user 31.

In the image processing system 1 according to the present embodiment, the notification selection portion 195 is included in the information processing apparatus 11. Therefore, in the image processing system 1 according to the present embodiment, the information processing apparatus 11 can select a notification aspect appropriate for the user 31.

In the present embodiment, a control method for the information processing apparatus 11 may be provided.

According to the control method for the information processing apparatus 11, the information processing apparatus 11 acquires an instruction for the image processing apparatus 12 based on at least one of the first operation input received by the first operation input portion 131-1 of the information processing apparatus 11 and the second operation input received by the second operation input portion 131-2 of the information processing apparatus 11. The information processing apparatus 11 requests image processing to the image processing apparatus 12 based on the acquired instruction, and selects at least one of the first notification portion 151-1 of the information processing apparatus 11 and the second notification portion 151-2 of the information processing apparatus 11 as a destination to which a notification of information regarding the image processing executed in the image processing apparatus 12 is sent.

A program executed by the information processing apparatus 11 may be provided. The program is a program causing a computer configuring the information processing apparatus 11 to realize a second function of requesting image processing to the image processing apparatus 12 based on an instruction that is acquired according to a first function of acquiring the instruction for the image processing apparatus 12 based on at least one of the first operation input received by the first operation input portion 131-1 of the information processing apparatus 11 and the second operation input received by the second operation input portion 131-2 of the information processing apparatus 11, and a third function of selecting at least one of the first notification portion 151-1 of the information processing apparatus 11 and the second notification portion 151-2 of the information processing apparatus 11 as a destination to which a notification of information regarding the image processing executed in the image processing apparatus 12 is sent.

A program for realizing the function of any constituent of any apparatus such as the information processing apparatus 11, the image processing apparatus 12, and the voice recognition server 13 described above may be recorded on a computer-readable recording medium, and the program may be read and executed by a computer system. The "computer system" mentioned here includes an operating system or hardware such as peripheral devices. The "computer-readable recording medium" refers to a portable medium such as a flexible disk, a magneto-optical disk, a ROM, a compact disc (CD)-ROM, or a storage device such as a hard disk built in the computer system. The "computer-readable recording medium" is assumed to include a medium that stores the program for a predetermined time, such as a volatile memory inside the computer system serving as a server or a client when the program is transmitted via a network such as the Internet or a communication line such as a telephone line. The volatile memory may be, for example, a RAM. The recording medium may be, for example, a non-transitory recording medium.

The program may be transmitted from a computer system that stores the program in a storage device or the like to another computer system via a transmission medium or a transmission wave in the transmission medium. Here, the "transmission medium" for transmitting the program refers to a medium having a function of transmitting information, such as a network such as the Internet or a communication line such as a telephone line. The program may be a program for realizing some of the functions described above. The program may be a so-called difference file, which can realize the above-mentioned function in combination with a program already recorded in the computer system. The difference file may be called a difference program.

The function of any constituent of any apparatus such as the information processing apparatus 11, the image processing apparatus 12, or the voice recognition server 13 described above may be realized by a processor. Each process in the embodiment may be realized by a processor that operates based on information such as a program and a computer-readable recording medium that stores information such as the program. Here, in the processor, a function of each constituent may be realized by individual hardware, or the function of each constituent may be realized by integrated hardware. The processor includes hardware, and the hardware may include at least one of a circuit that processes a digital signal and a circuit that processes an analog signal. The processor may be configured by using one or both of one or a plurality of circuit devices mounted on a circuit board, and one or a plurality of circuit elements. An integrated circuit (IC) or the like may be used as the circuit device, and a resistor or a capacitor may be used as the circuit element.

Here, the processor may be a CPU. The processor is not limited to the CPU, and various processors such as a graphics processing unit (GPU) or a digital signal processor (DSP) may be used. The processor may be a hardware circuit based on an application specific integrated circuit (ASIC). The processor may be configured with a plurality of CPUs, or may be configured with a hardware circuit including a plurality of ASICs. The processor may be configured with a combination of a plurality of CPUs and a hardware circuit including a plurality of ASICs. The processor may include one or more of amplifier circuits or filter circuits that process an analog signal.

Although the embodiment of the present disclosure has been described in detail with reference to the drawings, a specific configuration is not limited to the embodiment, and includes design and the like within the scope without departing from the spirit of the present disclosure.

What is claimed is:

1. An image processing system comprising:
an information processing apparatus; and
an image processing apparatus, wherein
the information processing apparatus includes:
a first operation input portion to receive a first operation input, wherein the first operation input is an operation input using voice;
a second operation input portion to receive a second operation input;
a first notification portion to perform a first notification;
a second notification portion to perform a second notification, wherein the first notification portion is different from the second notification portion; and
a first processor configured to:
acquire an instruction for the image processing apparatus based on the first operation input received by the first operation input portion or the second operation input received by the second operation input portion; and
request image processing to the image processing apparatus based on the acquired instruction,
the image processing apparatus includes a second processor configured to:
receive a request for the image processing from the information processing apparatus; and
execute the image processing based on the received request,
the first processor is further configured to select at least one of the first notification portion and the second notification portion of the information processing apparatus as a destination to which a notification of a processing result regarding the image processing executed by the image processing apparatus is sent,
the at least one of the first notification portion and the second notification portion is selected based on information associated with the voice that is input to the first operation input portion; and
the information associated with the voice that is input to the first operation input portion corresponds to one of noise level included in the voice that is input to the first operation input portion or a volume level of the voice that is input to the first operation input portion.

2. The image processing system according to claim 1, wherein
the first notification portion is further performs the first notification by using a voice output, and
the second notification portion is further performs the second notification that do not use the voice output.

3. The image processing system according to claim 2, wherein the first processor is further configured to select the second notification portion when the noise level included in the voice that is input to the first operation input portion exceeds a first threshold value.

4. The image processing system according to claim 2, wherein
the first processor is further configured to select the first notification portion when the volume level of the voice that is input to the first operation input portion is less than a second threshold value, and the first notification portion is further performs the first notification by using the voice output with a level less than a third threshold value.

5. The image processing system according to claim 4, wherein the first processor is further configured to select both of the first notification portion and the second notification portion when the volume level of the voice that is input to the first operation input portion is less than the second threshold value.

6. The image processing system according to claim 2, wherein
the first processor is further configured to select the first notification portion when the first operation input is received by the first operation input portion.

7. The image processing system according to claim 1, wherein the second operation input is a manual operation input.

8. The image processing system according to claim 1, wherein the second operation input is an operation input using a captured image.

9. A control method for an information processing apparatus including a first operation input portion, a second operation input portion, a first notification portion, and a second notification portion, and performing communication with an image processing apparatus, the control method comprising:
acquiring an instruction for the image processing apparatus based on a first operation input received by the first operation input portion or a second operation input received by the second operation input portion, wherein the first operation input is an operation input using voice;
requesting image processing to the image processing apparatus based on the acquired instruction; and
selecting at least one of the first notification portion and the second notification portion as a destination to which a notification of a processing result regarding the image processing executed by the image processing apparatus is sent, wherein
the first notification portion is different from the second notification portion,
the at least one of the first notification portion and the second notification portion is selected based on information associated with the voice that is input to the first operation input portion, and
the information associated with the voice that is input to the first operation input portion corresponds to one of noise level included in the voice that is input to the first operation input portion or a volume level of the voice that is input to the first operation input portion.

10. The control method for the information processing apparatus according to claim 9, further comprising:
performing, by the first notification portion, a first notification by using a voice output, and
performing, by the second notification portion, a second notification that do not use the voice output.

11. The control method for the information processing apparatus according to claim 10, wherein
when the noise level included in the voice that is input to the first operation input portion exceeds a first threshold value, the second notification portion is selected.

12. A non-transitory computer-readable storage medium storing computer-executable instructions in a computer configuring an information processing apparatus including a first operation input portion, a second operation input portion, a first notification portion, and a second notification portion, and performing communication with an image processing apparatus, causing the computer to:
acquiring an instruction for the image processing apparatus based on a first operation input received by the first operation input portion or a second operation input received by the second operation input portion, wherein the first operation input is an operation input using voice;
requesting image processing to the image processing apparatus based on the acquired instruction; and
selecting at least one of the first notification portion and the second notification portion as a destination to which a notification of a processing result regarding the image processing executed by the image processing apparatus is sent, wherein
the first notification portion is different from the second notification portion,
the at least one of the first notification portion and the second notification portion is selected based on information associated with the voice that is input to the first operation input portion, and
the information associated with the voice that is input to the first operation input portion corresponds to one of noise level included in the voice that is input to the first operation input portion or a volume level of the voice that is input to the first operation input portion.

13. The non-transitory computer-readable storage medium according to claim 12, further comprising:
performing, by the first notification portion, a first notification by using a voice output, and
performing, by the second notification portion, a second notification that do not use the voice output.

14. The non-transitory computer-readable storage medium according to claim 13, wherein
when the noise level included in the voice that is input to the first operation input portion exceeds a first threshold value, the second notification portion is selected.

* * * * *